United States Patent [11] 3,551,634

[72] Inventor Willi Veldgen
 Gummersbach, Rospe, Germany
[21] Appl. No. 782,252
[22] Filed Dec. 9, 1968
[45] Patented Dec. 29, 1970
[73] Assignee L. & C. Steinmuller G.m.b.H.
 Gummersbach, Rhineland, Germany
[32] Priority Dec. 9, 1967
[33] Germany
[31] 1,556,263

[54] APPARATUS FOR FEEDING CERAMIC RINGS
 2 Claims, 5 Drawing Figs.
[52] U.S. Cl. ..................................................... 219/98
[51] Int. Cl. ....................................................... B23k 9/20
[50] Field of Search............................................ 219/98, 99

[56] References Cited
UNITED STATES PATENTS
3,371,184 2/1968 Napoli........................... 219/98
3,401,250 9/1968 Logan........................... 219/98
3,448,236 6/1969 Spisak........................... 219/98

Primary Examiner—J. V. Truhe
Assistant Examiner—R. O'Neill
Attorney—Walter Becker ABSTRACT: An apparatus for feeding ceramic rings for studs to be welded to pipes by a welding gun, which includes: feeding means for feeding ceramic rings to a welding station, holding means, reciprocable transfer means movable in a direction perpendicular to the feeding direction of said feeding means and operable to grasp one ceramic ring at a time advanced by said feeding means and to transfer the respective grasped ring to said holding means, said holding means being operable in response to the insertion of a stud into the respective ceramic ring in said holding means and to the downward movement of said respective ring to yield so as to release said ceramic ring and permit the same to slide on the respective stud onto the pipe to be studded.

INVENTOR
Willi Veldgen

APPARATUS FOR FEEDING CERAMIC RINGS

The present invention relates to an apparatus for feeding ceramic rings for studs to be welded to pipes by means of welding guns.

When welding studs to pipes, it is necessary in order to obtain an intimate welding connection that the welding region during the phase is shielded as far as possible against heat loss, and that the light arc is held at the welding area, and that furthermore air and gas are kept away as far as possible from the welding region. To this end, during the welding phase ceramic rings are placed around the foot of the stud. In view of the great number of studs to be applied to a pipe, it is expedient in conformity with the feeding of the studs, also to provide a ceramic ring feeding which will permit carrying out the entire working operation at least in a semiautomatic manner.

It is, therefore, an object of the present invention to provide a feeding apparatus for ceramic rings which will assure an at least semiautomatic welding operation.

It is another object of this invention to provide an apparatus according to the preceding paragraph, which will be relatively simple in construction and operation and will be highly reliable.

TThese and other objects and advantages of the invention will appear more clearly from the following specification in connection with the accompanying drawings, in which.

Figure 1:
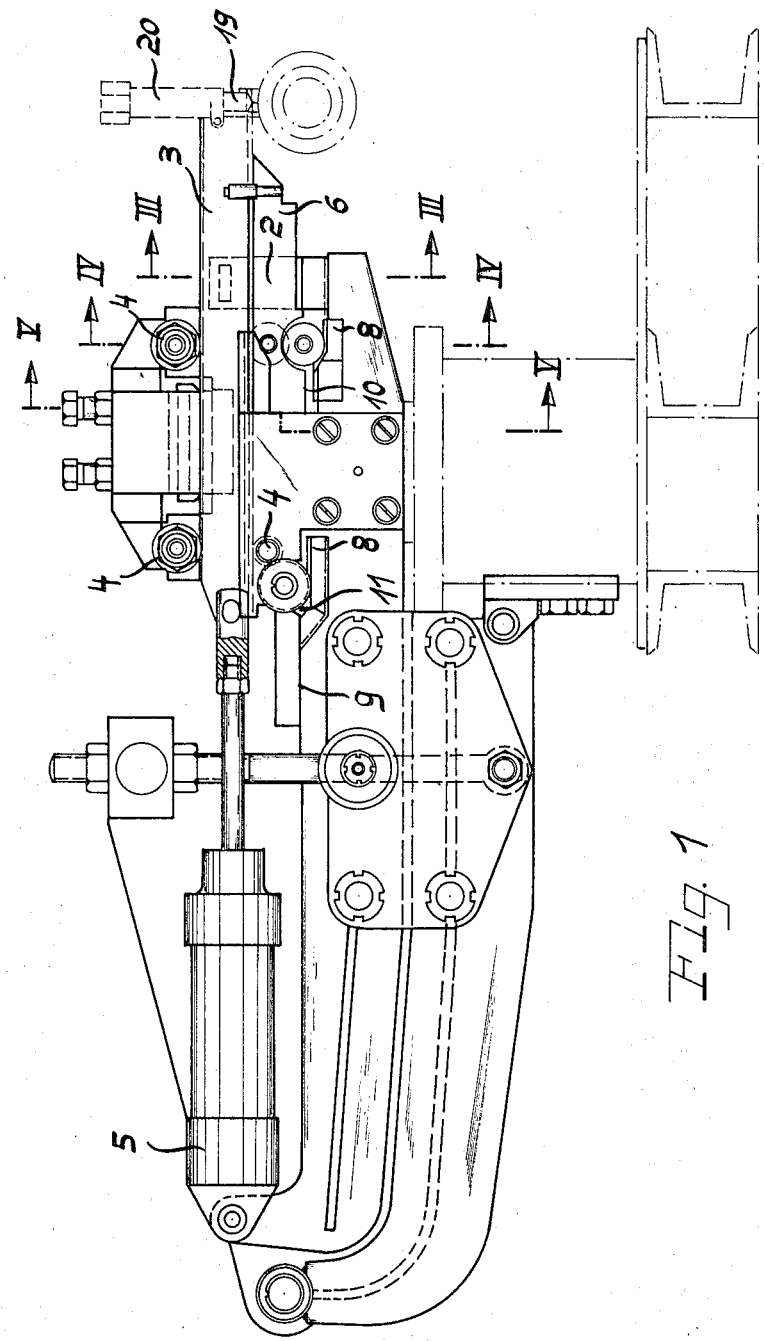
FIG. 1 represents a side view of an embodiment of the apparatus according to the invention.
Figure 2:
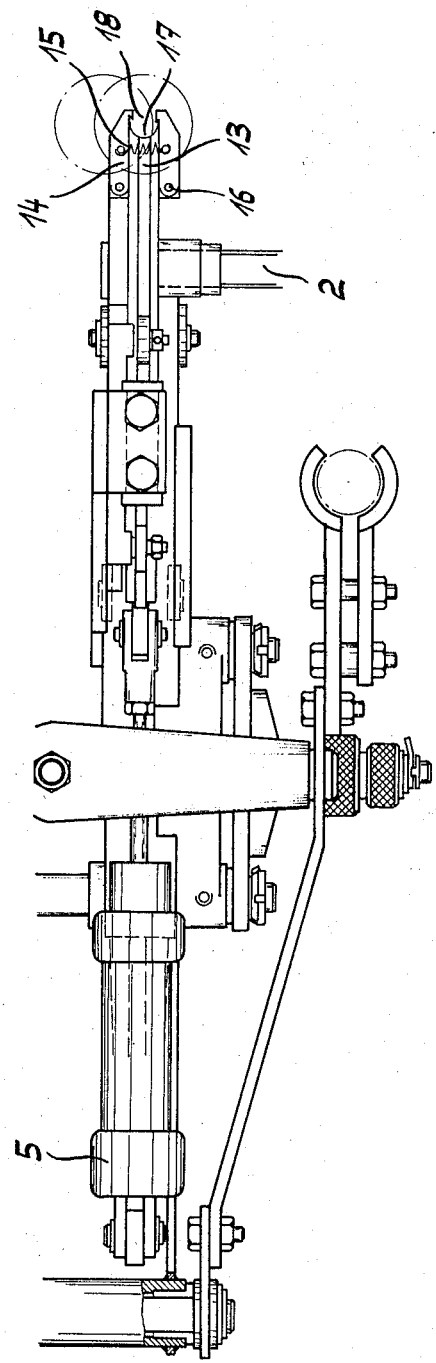
FIG. 2 is a top view of the apparatus according to FIG. 1
Figure 3:
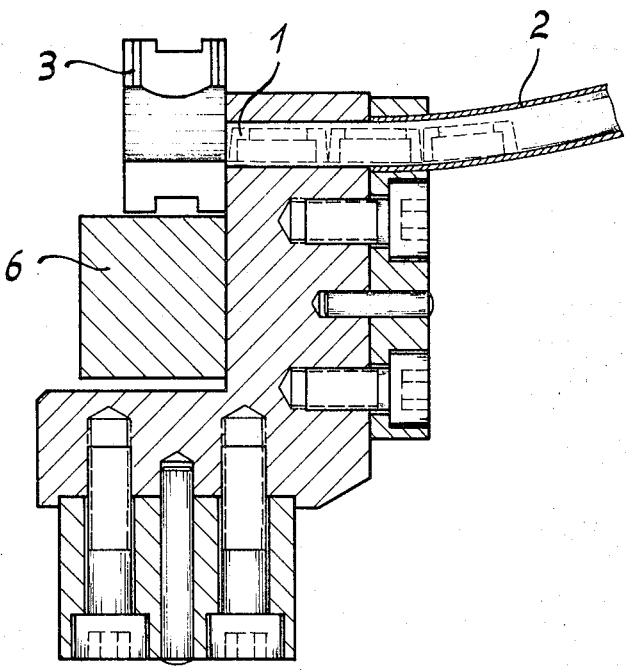
FIG. 3 represents a section taken along the line III–III of FIG. 1.
Figure 4:
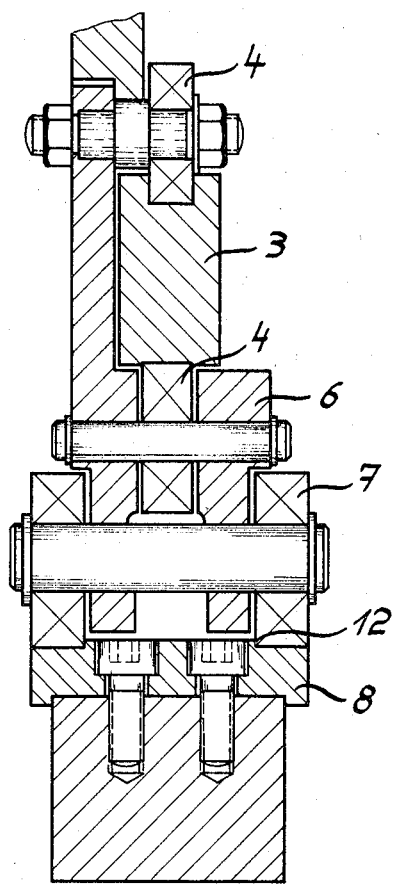
FIG. 4 illustrates a section taken along the line IV–IV of FIG. 1.
Figure 5:
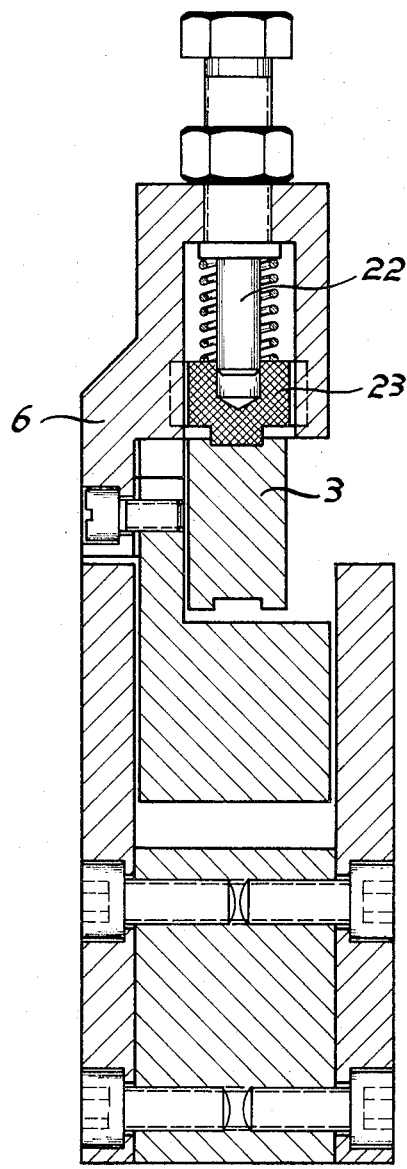
FIG. 5 is a section taken along the line V–V of FIG. 1.

The apparatus for feeding ceramic rings, according to the present invention, is characterized primarily in that ceramic rings which are fed by lateral feeding means and arrive in a properly located position are grasped by slides which are moved over rollers stationarily located on guiding carriages, said slides being movable perpendicularly with regard to the direction of feeding of said rings. The said slides have their end cone-shaped downwardly in such a manner that when introducing the studs into the respective ceramic rings and feeding said rings in downward direction, the individual elements of the plierlike holding devices are moved outwardly to such an extent that after said holding devices release the rings, the ceramic rings will automatically slide over the pins to be welded to the respective pipe onto the back of the pipe.

Since, as a rule, a plurality of welding guns are arranged one adjacent to the other and inasmuch as the studs are welded to the pipe either in parallel arrangement or in series, it is necessary that when applying a certain number of studs, during the advance of the pipe in longitudinal direction, the guiding carriages are lifted to such an extent that a contact between the welded-on studs with the ceramic-ring-feeding device will be avoided.

According to a further development of the invention, the guiding carriages may be so designed that their rollers are movable on coulisse-shape elements which preferably comprise two parallel surfaces of different height and an inclined plate interconnecting said parallel surfaces.

According to a still further development of the invention, the slides which are positively guided by rollers in said guiding carriages are by means of braking members prevented from moving until the rollers of the guiding carriages engage fixed abutments.

In order to assure that with a faulty control and an advance of the pipe caused thereby, the feeding device for the ceramic rings will not be damaged, it is suggested according to the present invention to so arrange the rear rollers of the guiding carriage (when viewed from the studded pipe), that the said rear rollers are overlapped by a coulisse which extends over said rear rollers in the form of a roof. As a result thereof, a lifting off of the carriage in upward direction at said place will be prevented, whereas the front guiding rollers will be able in view of the absence of said roof-shaped coulisse to divert upwardly.

Referring now to the drawings in detail, the ceramic rings 1 are fed through lateral feeding means 2 to the guiding slides 3. These guiding slides 3 carry out a movement which is perpendicular to the direction in which said rings are fed. The movement of the guiding slides 3 which are positively guided by rollers 4 is effected through the intervention of working cylinder piston system 5 which may be operated hydraulically or pneumatically. The rollers 4 which form the positive guiding means for the guiding slides 3 are mounted on guiding carriages 6 which, in their turn, are movable on rollers 7. The rollers 7 move on coulisse-shaped guiding means 8 which are arranged on two planes 9 and 10 of different height and a corresponding plane 11 each interconnecting the respective two planes pertaining thereto. The rollers 7 guided on the guiding means 8 and pertaining to the guiding carriages 6 are assured against lateral displacement displacement inasmuch as the guiding paths are on the inside provided with shoulders 12.

The ceramic rings 1 are grasped by the slide 3 and are moved into a plierlike holding device 13, the jaws 14 of which, are, by means of a tension spring 15, pressed together through the intervention of joints 16 against an abutment 17. The front free end 18 of the holding device 13 is cone-shaped in downward direction in such a way that the conical surface simultaneously forms the supporting surface for the ceramic ring. After the ceramic ring has been brought into its feeding position, the feeding of the stud 19 in downward direction is effected by the spindle 20 of the welding gun. In this connection, the spindle 20 rests on the marginal area of the ceramic ring 1 and presses the latter by means of the elastic spring effect of the jaws 14 pertaining to the holding means 13 downwardly so that after the release of the ceramic ring 1 by the jaws 14, the ring will, guided by the stud 19, slip onto the back of the pipe.

Since, as a rule, a plurality of rows of studs are welded adjacent to each other during a welding phase before the pipe is advanced in its longitudinal direction, it is necessary that the slides 3 with their guiding carriages 6 are retracting prior to the welding of the studs 19. This is brought about by returning the working cylinder to its starting position while simultaneously the rollers 7 of the guiding carriage 6 roll over the inclined plane 11 onto the next higher plane of the coulisse guiding means whereby simultaneously the jaws 14 of the holding device 13 for the ceramic rings are lifted.

During the return movement of the working working cylinder, the slide is held first by the brake 22 so that the entire guiding carriage will by means of the coulisse guiding means by moved rearwardly. Only after rollers 7 of the guiding carriage 6 abut a fixed abutment, the frictional force brought about by the braking member 23, will be overcome, and the slide 3 will be moved backwardly further. During the forward movement, this operation is repeated but in the inverse manner.

In order during faulty controls to secure the guiding carriage with its accessories in its front position, those rollers, which when looking from the pipe to be studded are the rear rollers, are covered by a roof-shaped coulisse so that as a result thereof a pivotal bearing will be formed for the guiding carriage by means of which the front portion of the guiding carriage can be pivoted. With the front guiding rollers, such roof-shaped coulisse missing.

The present invention provides an apparatus which in a simple and safe manner and without special structural expensive arrangements will be able to feed the ceramic rings to the studs to be welded to the pipe.

It is, of course, to be understood that the present invention is, by no means, limited to the particular arrangement shown in the drawings, but also comprises modifications within the scope of the appended claims.

I claim:
1. An apparatus for feeding ceramic rings for studs to be welded to pipes by a welding gun, which includes: feeding means for feeding ceramic rings to a welding station, holding means, reciprocable transfer means movable in a direction perpendicular to the feeding direction of said feeding means and operable to grasp one ceramic ring at a time advanced by said feeding means and to transfer the respective grasped ring to said holding means, said holding means operable in response to the insertion of a stud into the respective grasped ring to said holding means, said holding means being operable in response to the insertion of a stud into the respective ceramic ring in said holding means and to the downward movement of said respective ring to yield so as to release said ceramic ring and permit the same to slide on the respective stud onto the pipe to be studded, guiding means for said reciprocable transfer means, said guiding means including guiding carriage means and roller means mounted on said carriage means and engaging said reciprocable transfer means, and coulisse-shaped means for supporting and guiding said carriage, said coulisse-shaped means having two parallel surfaces at different levels and also having an inclined surface interconnecting said parallel surfaces, and said carriage having roller means engaging said coulisse-shaped means.

2. An apparatus according to claim 1, which includes fixed abutment means, and brake means operable to prevent movement of said transfer means and to release said transfer means in response to the roller means of said carriage means engaging said abutment means.